(No Model.)
L. SCHUTTE.
CHECK VALVE.
No. 524,049. Patented Aug. 7, 1894.
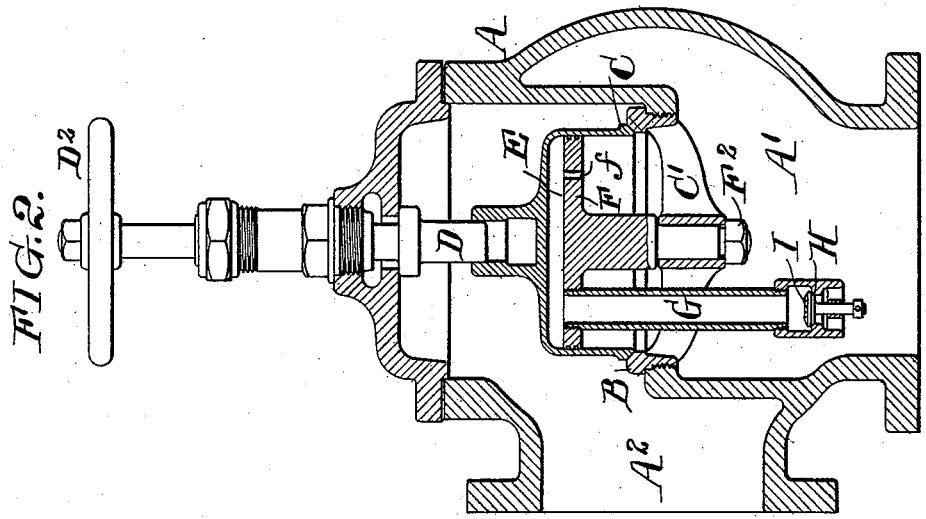
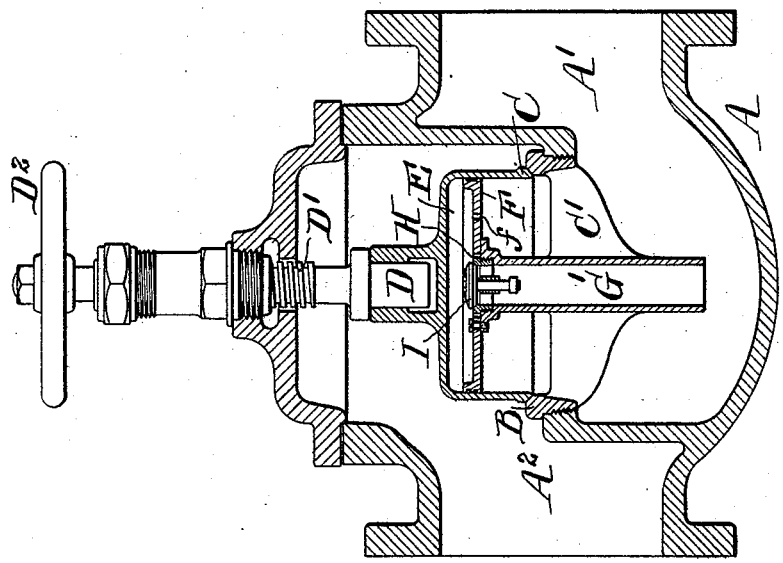
Witnesses:
Edw. F. Ayres.
Ferguson Hastings
Inventor:
Louis Schutte
by his atty
Francis T. Chambers

UNITED STATES PATENT OFFICE.

LOUIS SCHUTTE, OF PHILADELPHIA, PENNSYLVANIA.

CHECK-VALVE.

SPECIFICATION forming part of Letters Patent No. 524,049, dated August 7, 1894.

Application filed February 1, 1894. Serial No. 498,713. (No model.)

*To all whom it may concern:*

Be it known that I, LOUIS SCHUTTE, a citizen of the United States, residing in Philadelphia, in the county of Philadelphia and State of Pennsylvania, have invented a certain new and useful Improvement in Check-Valves, of which the following is a true and exact description, reference being had to the accompanying drawings, which form a part thereof.

My invention relates to check valves, and has for its object to provide a check-valve which shall be unaffected by momentary pulsations in the flow or pressure of the current which flows past it thus avoiding the tendency of such valves to hammer on their seats.

In my Patent No. 328,979, granted October 27, 1885, I have shown and described such a valve, and my present invention is in the nature of an improvement, consisting essentially in adding to a valve of the same general character, a conduit which will freely open to permit the fluid on the receiving side of the valve to enter the regulating cylinder, but which will close when the pressure on the receiving side diminishes compelling the fluid in the cylinder to escape therefrom through more restricted openings than that or those by which it enters. In this way, I insure the rapid raising of the valve, and, as in my former construction, preserve the feature of a gradual closing.

My invention will be best described in connection with the accompanying drawings, in which—

Figure 1 is a vertical section of a valve provided with my improvements, and Fig. 2 a similar view illustrating a slight modification.

A is a valve casing forming part of a conduit; B is a valve seat therein, A' indicating the receiving and $A^2$ the discharge sides of the valve; C is a check valve, arranged as usual, to close the conduit. In connection with this valve I employ a cylinder and piston of which one member is movable and attached to the valve so as to move with it; access for the fluid on the receiving side of the valve to the cylinder must be provided for, so that the inflow of fluid will tend to raise the valve, and provision must also be made for the outflow of the fluid, to permit the valve to seat itself, and as already stated, my improved construction requires that the inflow should be free while the outflow is comparatively restricted.

Referring again to the drawings; in the construction shown the valve C is chambered so as to form a cylinder E for a stationary piston F, which is held in place by the spider C' connected conveniently to the valve seat B.

A conduit is provided for conducting fluid pressure from the receiving side of the valve into the cylinder E so as to raise the valve C. This conduit is preferably a pipe, shown at G in Fig. 2 secured to the piston F, which is itself secured to the spider C' by means of a nut $F^2$, while in Fig. 1 the pipe G' is formed with or attached to the spider, and the piston F is secured on the end of the pipe as shown.

I is a check valve seating on a valve seat H in the conduit and adapted to prevent or check the backward flow of fluid from the cylinder E. In order to permit the pressure in this cylinder to be reduced, so that the valve C will fall when the pressure on the receiving side A' is, save momentarily, equal or less than that on the outlet side, the valve I or the piston F may be made sufficiently loose fitting to permit the slow return of fluid around them. I prefer however, to supplement this escape by forming a small opening *f* leading from the cylinder E, preferably, to the receiving side of the valve.

While I have shown the valve as having a cylinder connected therewith and the piston F stationary, it is, of course, an obvious equivalent to connect the piston to the valve and make the cylinder stationary.

D is a spindle, screw threaded at D' and connected to a hand wheel $D^2$ so that the valve may be clamped to its seat if desired.

When a current flows from the side A' to the side $A^2$, or when there is an excess of pressure on the side A the cylinder E will be immediately filled with fluid from and under the pressure of the fluid on the receiving side A' and the valve C will be raised to permit the flow of fluid past it, and as the pressure in the cylinder E is reduced comparatively slowly the valve will not be influenced by sudden variations or pulsations of pressure in either side of it, but will seat itself when the current from the receiving side entirely fails or the pressure on the outlet side becomes more than momentarily, the same, or greater than that on the receiving side.

Having now described my invention, what I claim as new, and desire to secure by Letters Patent, is—

1. In combination with a conduit, a check valve arranged to close the same, a cylinder and piston, the movable member of which is attached to and moves with the valve an opening leading to the inside of the cylinder from the receiving side of the valve, and serving to admit fluid under pressure thereto to open the valve and a check valve as I arranged in said opening, and adapted to admit fluid to the cylinder but check its escape therefrom.

2. In combination with a conduit, a check valve arranged to close the same, a cylinder and piston, the movable member of which is attached to and moves with the valve, an opening leading to the inside of the cylinder from the receiving side of the valve and serving to admit fluid under pressure thereto to open the valve, a check valve as I arranged in said opening and adapted to admit fluid to the cylinder but check its escape therefrom and a contracted escape orifice leading from the cylinder.

3. In combination with a conduit, a check valve arranged to close the same, a cylinder and piston, the movable member of which is attached to and moves with the valve, a pipe conduit independent of the valve leading to the inside of the cylinder from the receiving side of the valve and serving to admit fluid under pressure thereto to open the valve, and a check valve arranged in said opening to admit fluid to the cylinder, but check its escape therefrom.

4. In combination with a conduit, a check valve arranged to close the same, said valve being chambered to form a cylinder E open to the receiving side of the valve, a valve seat B having a spider C', a piston F secured to said spider and adapted to fit neatly in the cylindrical chamber E of the valve in all positions of said valve, and restricted orifice or passage for fluid leading from the inside of the cylinder to the receiving side of the valve.

5. In combination with a conduit, a check valve arranged to close the same, said valve being chambered to form a cylinder E open to the receiving side of the valve, a valve seat B having a spider C', a pipe G' secured to the spider, a piston F secured to the pipe G' and adapted to fit in the chamber E of the valve and a check valve I in the pipe G' adapted to admit fluid to the cylindrical chamber E but check its escape therefrom.

LOUIS SCHUTTE.

Witnesses:
ROBERT W. LLOYD,
D. STEWART.